United States Patent
Radke

(10) Patent No.: US 8,704,840 B2
(45) Date of Patent: *Apr. 22, 2014

(54) MEMORY SYSTEM HAVING MULTIPLE ADDRESS ALLOCATION FORMATS AND METHOD FOR USE THEREOF

(75) Inventor: William Radke, San Francisco, CA (US)

(73) Assignee: Micron Technology, Inc., Boise, ID (US)

(*) Notice: Subject to any disclaimer, the term of this patent is extended or adjusted under 35 U.S.C. 154(b) by 28 days.

This patent is subject to a terminal disclaimer.

(21) Appl. No.: 13/189,311

(22) Filed: Jul. 22, 2011

(65) Prior Publication Data

US 2011/0279465 A1    Nov. 17, 2011

Related U.S. Application Data

(63) Continuation of application No. 12/139,143, filed on Jun. 13, 2008, now Pat. No. 7,990,391, which is a continuation of application No. 10/984,373, filed on Nov. 8, 2004, now Pat. No. 7,397,477, which is a continuation of application No. 09/736,851, filed on Dec. 13, 2000, now Pat. No. 6,816,165.

(51) Int. Cl.
  *G09G 5/36*   (2006.01)
  *G06F 12/00*  (2006.01)
  *G06F 12/02*  (2006.01)

(52) U.S. Cl.
  USPC .......................... 345/559; 345/564; 345/567

(58) Field of Classification Search
  USPC .......................... 345/559, 564–574
  See application file for complete search history.

(56) References Cited

U.S. PATENT DOCUMENTS

| | | | |
|---|---|---|---|
| 4,507,730 A | 3/1985 | Johnson et al. | 364/200 |
| 5,293,593 A | 3/1994 | Hodge et al. | 395/400 |
| 5,357,621 A | 10/1994 | Cox | 395/400 |
| 5,936,616 A | 8/1999 | Torborg et al. | 345/202 |
| 5,990,912 A | 11/1999 | Swanson | 345/516 |
| 6,128,094 A | 10/2000 | Smith | 358/1.15 |
| 6,167,498 A | 12/2000 | Larson et al. | 711/202 |
| 6,252,612 B1 | 6/2001 | Jeddeloh | 345/521 |
| 6,438,664 B1 | 8/2002 | McGrath et al. | 711/154 |
| 6,614,443 B1 | 9/2003 | Peterson | 345/569 |
| 6,667,745 B1 | 12/2003 | Hussain | 345/545 |
| 6,791,555 B1 | 9/2004 | Radke et al. | 345/532 |
| 7,180,522 B2 | 2/2007 | Radke et al. | 345/531 |

*Primary Examiner* — Hau Nguyen
(74) *Attorney, Agent, or Firm* — Dorsey & Whitney LLP

(57) ABSTRACT

A memory system having multiple address allocation methods for graphics data in a computer graphics processing system. The memory system includes a plurality of memory arrays, and a format register having a programmable format flag. The status of the format flag indicates the memory address allocation format in which the memory addresses for each of the memory arrays are allocated. An address decoder is coupled to the format register to obtain the status of the format flag in order to determine the address allocation method for an array being accessed. The address decoder is further coupled to receive a requested address for a memory location in one of the memory arrays and then provide a requested memory address to the memory arrays to access. The requested address is translated by the address decoder to the requested memory address according to the memory address allocation format indicated by the format flag status for the memory array.

16 Claims, 4 Drawing Sheets

MEMORY SYSTEM HAVING MULTIPLE ADDRESS ALLOCATION FORMATS AND METHOD FOR USE THEREOF

CROSS-REFERENCE TO RELATED APPLICATION

This application is a continuation of U.S. patent application Ser. No. 12/139,143, filed Jun. 13, 2008, U.S. Pat. No. 7,990,391, which is a continuation of U.S. patent application Ser. No. 10/984,373, filed Nov. 8, 2004, U.S. Pat. No. 7,397,477, which is a continuation of U.S. patent application Ser. No. 09/736,851, filed Dec. 13, 2000, U.S. Pat. No. 6,816,165. These applications and patents are incorporated by reference herein in their entirety and for all purposes.

TECHNICAL FIELD

The present invention is related generally to the field of computer graphics, and more particularly, to a memory system and method for use in a computer graphics processing system.

BACKGROUND OF THE INVENTION

Graphics data is typically stored in memory in a one-dimensional (1D), or linear, fashion, although data is often conceptually depicted in two-dimensions (2D). For example, a texture map is conceptually represented as having two-dimensions (u, v), but in actuality, the texture data is stored in memory such that the memory addresses for the texture map data are sequential. In accessing the texture data, the requested memory addresses are incremented to access the texture data in a row-like fashion. When the address for the texture data for the last texel in a row is accessed, the memory address is again incremented to roll over and access the texture data for the first texel in the next row.

Typically, data that is requested for processing is retrieved from memory in blocks and temporarily stored for processing in memory pages. In the case of a texture map, each memory page typically includes the texture data for one row of the texture map. When additional data is requested for processing, the memory page of data is first checked for the requested data before performing a memory access operation. If the requested data is already present in the memory page, then overall processing time is reduced. However, if the requested data is not present in the memory page, a "page miss" occurs, and another block of data including the requested data is retrieved from memory to replace the former memory page of data. Page misses add to the overall processing time, and consequently, it is desirable to avoid frequent page misses.

A problem with storing 2D data, such as texture data, in a 1D arrangement is that when bilinear interpolation is performed to determine the color value of a destination pixel in a graphics image on which the texture map is applied, the texture data for four texels from two different rows are required. In bilinear filtering, the color values of four texels closest to the respective location of the pixel are weighted and a resulting color value for the pixel is interpolated from the color value of the four texels. The four texels closest to the destination pixel are naturally arranged in a two-by-two square, and are thus occupy two different rows. As previously discussed, the texture data for two different rows are located on two different memory pages. Consequently, when the texture data for the four closest texels to the destination pixel are retrieved, an average of two page misses will occur: once when the data for the two texels from the first row are retrieved, and once again when the data for the two texels from the second row are retrieved. The page misses slow down the processing of the texture data because the data from one page is purged when the texture data of another page is loaded. An approach to reducing the occurrences of page misses where bilinear interpolation is applied is to implement a "two-dimensional" memory array such that the memory is conceptually segmented into several small 2D arrays. In this fashion, although the width of a texture map is divided into several 2D segments, the texture data for texels of several adjacent rows may be stored on a common memory page. Thus, the number of page misses occurring during texture application is reduced. Another approach to reducing page misses is disclosed in co-pending U.S. patent application Ser. No. 09/515,246, entitled METHOD AND SYSTEM FOR ADDRESSING GRAPHICS DATA FOR EFFICIENT DATA ACCESS to Peterson, filed on Feb. 29, 2000. The approach described therein maps texture data of a texture map into virtual two-dimensional memory arrays but is implemented in a one-dimensional memory space. An offset value is determined from the (u, v) texel coordinates for the requested texels, and from the offset values, a virtual 2D memory address is calculated and used to effectively store in a 1D memory space the texture data in virtual 2D arrays. As a result, where texels of two different rows of the texture map are required for bilinear filtering, the arrangement of the texels in the virtual 2D memory arrays facilitates texel data processing and minimizes the occurrences of page misses. Although the methods described solve much of the problem with page misses, data is mapped according to a 2D arrangement regardless of the type of data being stored. In cases where it is more efficient to store the data in a 1D fashion, the use of the virtual 2D addressing actually creates inefficient data storage.

DETAILED DESCRIPTION OF THE INVENTION

Embodiments of the present invention provide a memory system having an address decoder that maps requested addresses into each of a plurality of memory arrays according to an address allocation format indicated by a format flag stored in a format register. Thus, a different address allocation format may be applied to each of the plurality of memory arrays. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
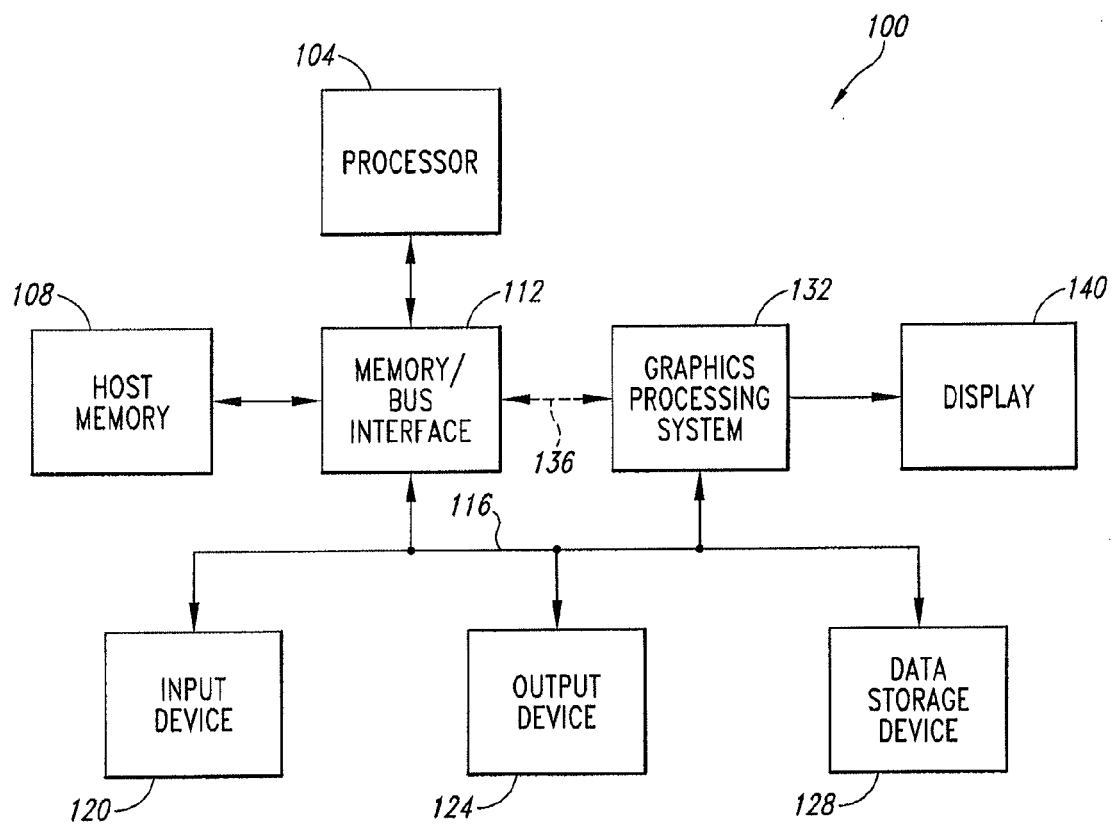
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
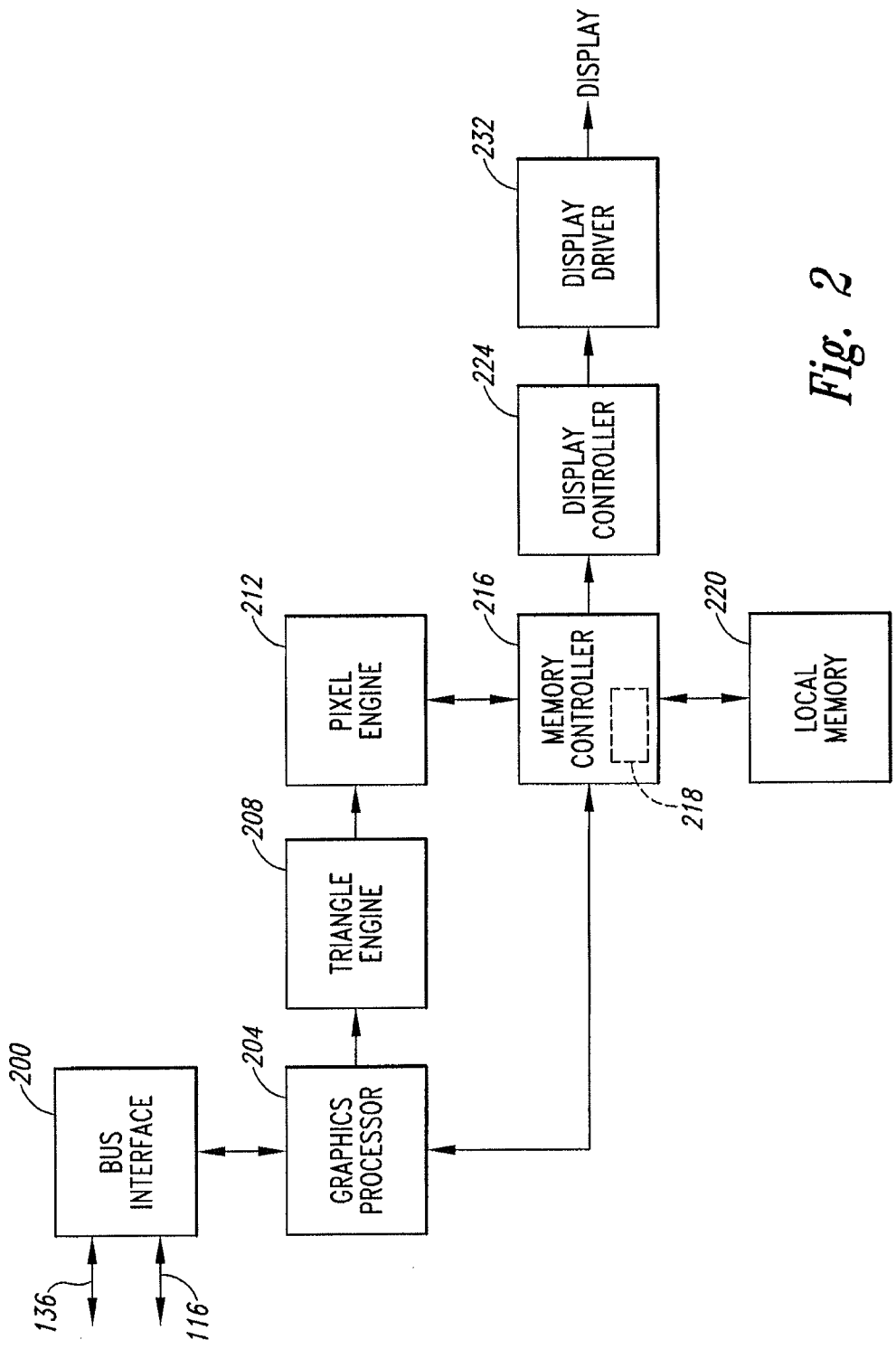
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map. A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion.

A memory controller 216 coupled to the pixel engine 212 and the graphics processor 204 handles memory requests to and from an local memory 220. The local memory 220 stores graphics data, such as source pixel color values and destination pixel color values. Included in the memory controller 216 is an address decoder 218, which, as will be explained in more detail below, may be configured to allocate the memory of the local memory 220 in either a linear or 2D format. The memory controller 216 further includes various registers (not shown) that store flag values that are used to set the allocation format of the address decoder 218. In this way, the memory controller 216 may be programmed to either use a linear or blocked memory allocation to provide the graphics processing system with more flexibility.

A display controller 224 is coupled to the memory controller 216 to receive processed destination color values for pixels that are to be rendered. The destination color values are subsequently provided to a display driver 232 that includes circuitry to provide digital color signals, or convert digital color signals to red, green, and blue analog color signals, to drive the display 140 (FIG. 1).

Figure 3:
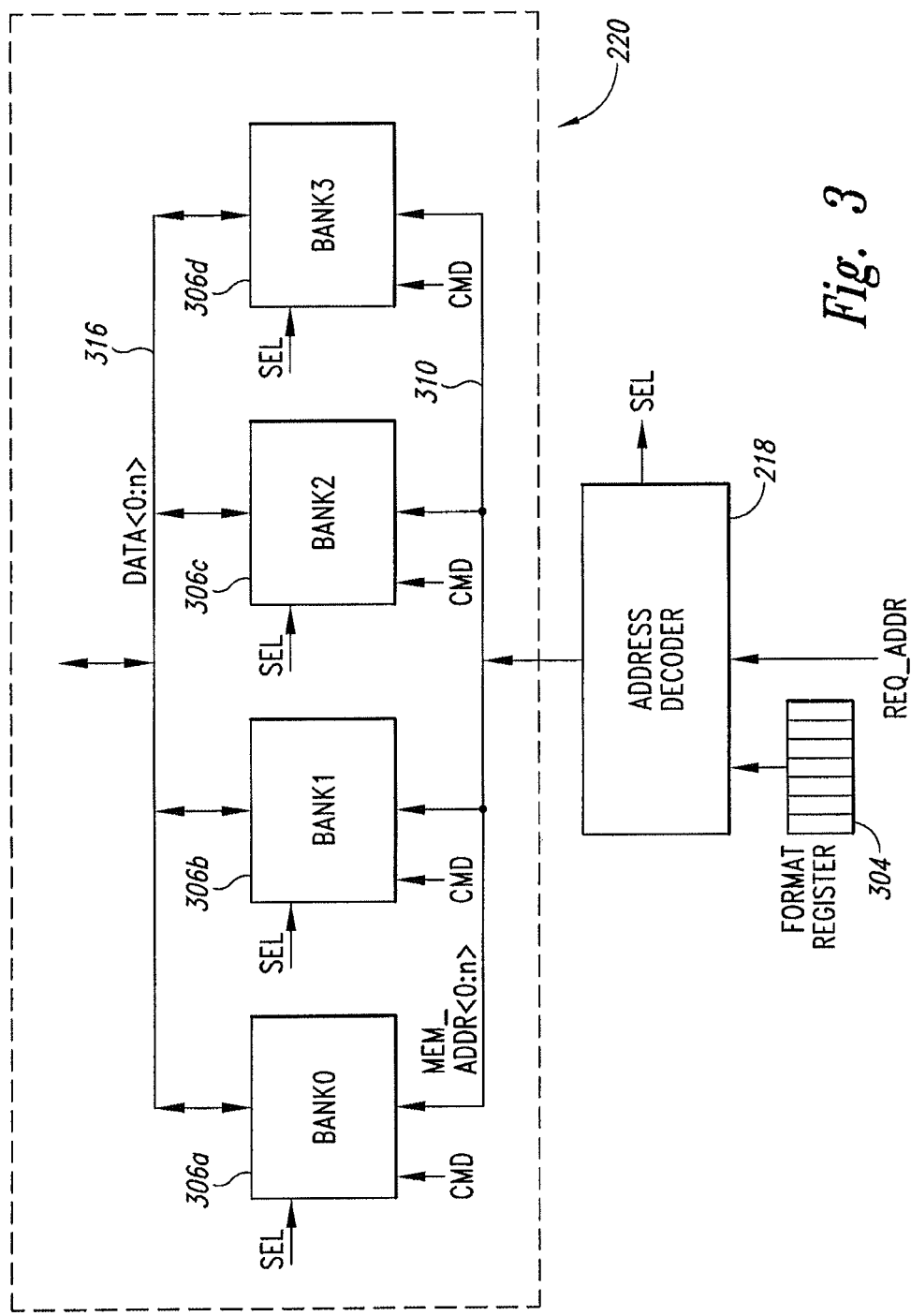
FIG. 3 is a block diagram of a portion of a memory system according to an embodiment of the present invention.

FIG. 3 illustrates a portion of the memory controller 216 and the local memory 220 according to an embodiment of the present invention. An address decoder 218 coupled to a format register 304 receives a requested address REQ_ADDR of a memory location that is to be accessed from a requesting entity (not shown). As will be explained in more detail below, the format register 304 stores flag values that are queried by the address decoder to determine whether a linear or 2D format should be used in accessing a requested memory location in the local memory 220. The status of the format flag may be programmed during the execution of a graphics application by the system processor 104 (FIG. 1) or the graphics processor 204 (FIG. 2). Thus, the address allocation format may be changed to suit the particular data. A portion of the local memory 220 is illustrated as including multiple banks of memory 306a-d that are coupled to receive a memory address MEM_ADDR<A0-An> from the address decoder 218 through an address bus 310. As will be explained in greater detail below, the MEM_ADDR<A0-An> may be same as the REQ_ADDR if the format register 304 stores a flag indicating that a linear address allocation should be used, or, where a 2D allocation is indicated, the MEM_ADDR<A0-An> will be an address translated from the REQ_ADDR. Each of the banks of memory 306a-d is further coupled to receive a bank select signal SEL from the address decoder 218. Data is provided to or from the banks of memory 306a-d over a memory data bus 316.

As mentioned previously, the memory addresses of the local memory 220 may be allocated by the address decoder 218 either in a linear fashion or a 2D fashion, depending on the desired format. The flag values of the format register 304 may be programmed by the graphics processor 204 (FIG. 2) during the execution of an graphics application such that the format in which the data being accessed changes during execution, thus, providing greater flexibility over conventional memory controllers that allocate memory in either a linear or 2D fashion. Allocation of memory according to a 2D format is accomplished by the address decoder 218 by way of address translation. Since memory allocation is accomplished at the hardware level, reading from or writing to the local memory 220 according to either a linear or 2D format is transparent to an application executing on processor 104 of the host computer 100 (FIG. 1).

It will be appreciated that a person of ordinary skill in the art would have sufficient understanding to implement embodiments of the memory system described herein without further details. For example, the address decoder 218 and format register 304 include conventional circuitry and logic gates clearly understood by a person of ordinary skill. Moreover, the provision of the SEL signal, the MEM_ADDR<A0-An> signals, and the CMD signals to each ban of memory 306a-c to enable the respective banks of memory to perform various operations, such as precharge, read data, write data, and the like, are well understood. Consequently, a detailed description of the memory banks has been omitted from herein in order to avoid unnecessarily obscuring the present invention.

An example of allocating memory addresses according to a blocked allocation format will now be described. It will be appreciated that other formats and methods of address allocation may be implemented in embodiments of the present invention without departing from the scope of the present invention. The example allocation method calculates from the requested address received by the memory decoder 218 (FIG. 3) a linear memory address that, when incremented, results in accessing the memory locations of the memory array in a virtual 2D fashion. The status of the format flag is programmed such that when the address decoder 218 queries the format register 304, the address decoder will allocate memory addresses accordingly. Using such an address allocation format reduces the number of page misses when interpolation methods are used to calculate the color values of destination pixels.

The requested linear address received by the memory decoder 218 is decoded into X and Y screen coordinates that are used together to calculate the linear memory address for the virtual 2D memory arrays. Using C programming notation:

X=Req_Addr/Mem_Addr_Mem; and
Y=Req_Addr % Mem_Addr_Mem where Req_Addr is the requested address received by the memory decoder 218, and Mem_Addr_Mem is the data width of the screen. The resulting X and Y values are the location of the requested linear address in a (x, y) coordinate system. The X value is the whole number resultant from the division of Req_Addr by Mem_Addr_Mem, and the Y value is the whole number remainder of the division of Req_Addr by Mem_Addr_Mem.

The memory arrays are partitioned into 2D blocks corresponding to the (256 kByte×8) virtual 2D arrays into which the memory address is calculated. Access to the memory arrays can be interlaced where the memory arrays are separated into multiple blocks to increase access throughput. Portions of the bit values of the X and Y values are rearranged and concatenated to calculate the memory array, the resulting block addresses, and the row and column addresses within the virtual 2D block. As written in C notation, the values are calculated from the following definitions:

Page=Y[13:3]* Mem_Width+X[8:4];
Flip_bank=Page[0] ^(Y[3] & Mem_Width[0]);
Pair_col=cat(Y[2:0], X[3:0]);
Pair_row=cat(flip_bank, Page[8:1]); and
Bank_set=cat(Page[10:9], Flip_bank)

where Mem_Width is the number of (256 Kbyte×8) blocks across the screen width, counting from zero. The resulting Pair_col and Pair_row values are used as the memory addresses by the address decoder 218 (FIG. 3) to access the memory arrays.

It will be appreciated that the address allocation formats described herein are provided by way of a non-limiting example. Therefore, the particular address allocation method applied in the memory system should not be interpreted as limiting the scope of the present invention. For example, other address allocations methods, such as alternating between blocks of the multiple banks of memory, and the like, may also be implemented in embodiments of the present invention without deviating from the scope of the present invention. It will be further appreciated that the description provided herein provides sufficient understanding for one of ordinary skill in the art to practice the invention. Particular details have been omitted for the sake of brevity, however, it will be clear to one skilled in the art that the invention may be practiced without these particular details.

Figure 4:
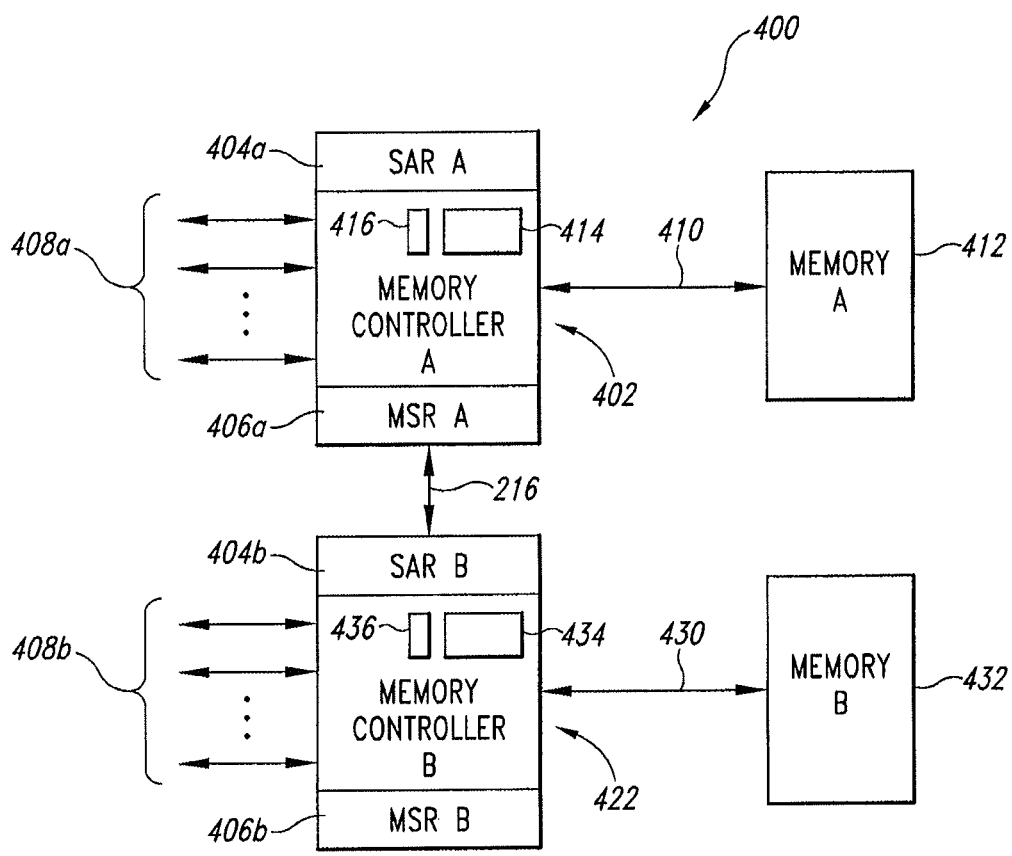
FIG. 4 is a block diagram of a memory system having a distributed memory controller arrangement.

FIG. 4 illustrates a distributed memory controller memory subsystem 400 that may be substituted into a graphics processing system. A more detailed description of a similar memory subsystem is provided in patent application Ser. No. 09/603,158, filed Jun. 23, 2000, which is incorporated herein by reference. To summarize, the memory subsystem 400 includes two memory controllers 402 and 422 coupled together through a memory controller bus 216. The memory controller bus 216 allows memory access requests, as well as data, to be passed between the two memory controllers 402 and 422. Each of the memory controllers 402 and 422 is coupled to an addressable memory area 412 and 432, respectively, that is defined by two values. The two values are stored in registers 404a-b and 406a-b. Registers 404a and 406a of the memory controller 402 store the start address and memory size for the addressable memory area 412, and registers 404b and 406b of the memory controller 422 store the start address and memory size value for the addressable memory area 432. These values are referenced by the respective memory controller to determine whether a memory access request is to a memory location in the addressable memory area to which the memory controller is coupled.

For example, the arrangement of the memory subsystem 400 allows a memory access request made to the memory controller 402 over request lines 408 to be passed to the memory controller 422 when the requested memory location has a memory address located in the addressable memory area 432. As mentioned previously, the memory controller receiving the memory access request can determine whether the requested address is located within the addressable memory area to which it is coupled by checking the values of the start address and memory size. In the present example, the memory controller 422 receives the memory access request from the memory controller 402, and accesses the addressable memory area 432 to service the memory access request. If the memory access request received by the memory controller 402 is a read command, the memory controller 422 reads the data from the requested memory location and provides the data back to the memory controller that originally received the memory access request, namely, the memory controller 402. If the memory access request was a write command, data to be written to the memory location accompanies the memory access request that is passed from the memory controller that originally received the memory access request.

An embodiment of the present invention implements the address controller and format register described with respect to FIG. 3 in a memory system having a distributed memory controller arrangement similar to that shown in and described with respect to FIG. 4. As illustrated in FIG. 4, address decoder 414 and format register 416 are included in the memory controller 402, and address decoder 434 and format register 436 are included in the memory controller 422. Operation of the memory controllers 402 and 422 is similar to the operation of the address decoder 218 and format register 304 (FIG. 3). That is, the address allocation format for the addressable memory areas 412 and 432 are set by the status of the respective format flags stored in format registers 416 and 436, respectively. The address decoders 414 and 434 will allocate memory addresses for the addressable memory areas 412 and 432, accordingly.

It will be also appreciated that the address allocation format applied to each of the addressable memory areas 412 and 432 may be applied throughout the entire addressable memory area, or, as understood by one of ordinary skill in the art, each of the addressable memory areas 412 and 432 may include multiple banks of memory arrays, similar to that shown in FIG. 3. As a result, each of the banks of memory may have a different address allocation format, allowing for multiple address allocation methods to be used within each of the addressable memory areas 412 and 432.

From the foregoing it will be appreciated that, although specific embodiments of the invention have been described herein for purposes of illustration, various modifications may be made without deviating from the spirit and scope of the invention. For example, the local memory 220 (FIG. 3) has been illustrated having four separate banks of memory. However, it will be appreciated that the particular number of banks included in the memory system, or within an addressable memory area, may change without deviating from the scope of the present invention. Accordingly, the invention is not limited except as by the appended claims.

The invention claimed is:

1. A memory system, comprising:
   a memory having addressable memory locations configured to store data;
   a format register configured to store first and second format flags; and
   an address decoder coupled to the memory and the format register, the address decoder configured to decode memory addresses to access the addressable memory locations of a first block of the memory in accordance with a first memory address allocation format responsive to the first format flag having a first state, the address decoder being further configured to decode memory addresses to access the addressable memory locations of a second block of the memory in accordance with a second memory address allocation format, different from the first memory address allocation format, responsive to the second format flag having a second state.

2. The memory system of claim 1, wherein the first memory allocation format comprises a linear format.

3. The memory system of claim 1, wherein the format register is configured to be programmed during execution of an application.

4. The memory system of claim 3, wherein the format register is configured to be programmed by at least one of a system processor or a graphics processor.

5. The memory system of claim 1, further comprising:
   a register configured to store at least one of a start address or a memory size.

6. A memory system, comprising:
   a memory having first and second memory locations;
   an address decoder coupled to the memory and configured to receive a memory address, the address decoder further configured to provide a query responsive, at least in part, to receipt of the memory address; and
   a format register coupled to the address decoder and configured to receive the query, the format register further configured to provide a flag signal responsive, at least in part, to the query,
   wherein the address decoder is configured to receive the flag signal and to access the first memory location using a first memory address allocation format based, at least in part, on the flag signal having a first state and configured to access the second memory location using a second memory address allocation format based, at least in part, on the flag signal having a second state.

7. The memory system of claim 6, wherein the flag signal is based, at least in part, on data corresponding to at least one of the first memory location or the second memory location.

8. The memory system of claim 6, wherein the first memory address allocation format comprises linear memory address allocation and the second memory address allocation format comprises 2D memory address allocation.

9. The memory system of claim 6, wherein the format register is configured to be programmed during execution of an application.

10. The memory system of claim 9, wherein the format register is configured to be programmed by at least one of a system processor and a graphics processor.

11. The memory system of claim 6, wherein the address decoder is further configured to receive the memory address responsive, at least in part, to the memory address being located within the first or second memory locations.

12. A method of decoding an address, the method comprising:
   receiving a first memory address at an address decoder;
   querying a format register responsive to the first memory address; and
   receiving a first format flag corresponding to the first memory address from the format register;
   decoding the first memory address according to a first memory address allocation format in a first portion of memory responsive to a first format flag having a first state;
   receiving a second memory address at the address decoder;
   querying the format register responsive to the second memory address; and
   receiving a second format flag corresponding to the second memory address from the format register; and
   decoding the second memory address according to a second memory address allocation format in a second portion of memory responsive to a second format flag having a second state,
   wherein the first and second memory address allocation formats are different.

13. The method of claim 12, further comprising:
   programming a third format flag.

14. The method of claim 12, wherein said decoding the first memory address comprises:
   determining whether the first memory address is located in the first portion of memory; and
   decoding the first memory address according to a first memory address allocation format in a first portion of memory responsive, at least in part, to determining that the first memory address is located in the first portion of memory.

15. The method of claim 12, wherein the first memory address allocation format comprises linear memory address allocation and the second memory address format comprises 2D memory address allocation.

16. The method of claim 12, wherein said decoding the second memory address comprises:
   translating the second memory address into a memory address corresponding to a 2D virtual array.

* * * * *